United States Patent
Gullin (10) Patent No.: US 9,514,177 B2
(45) Date of Patent: Dec. 6, 2016

(54) METHOD, APPARATUS AND COMPUTER PROGRAM FOR DETECTING DEVIATIONS IN DATA REPOSITORIES

(71) Applicant: Telefonaktiebolaget L M Ericsson (publ), Stockholm (SE)

(72) Inventor: Patrick Gullin, Karlskrona (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 233 days.

(21) Appl. No.: 14/065,562

(22) Filed: Oct. 29, 2013

(65) Prior Publication Data

US 2014/0122443 A1    May 1, 2014

(30) Foreign Application Priority Data

Nov. 1, 2012 (EP) .................................. 12190962

(51) Int. Cl.
G06F 17/30 (2006.01)
G06F 11/34 (2006.01)

(52) U.S. Cl.
CPC ..... *G06F 17/30371* (2013.01); *G06F 11/3452* (2013.01); *G06F 17/30303* (2013.01); *G06F 17/30578* (2013.01)

(58) Field of Classification Search
CPC .................... G06F 17/30578; G06F 17/30303
USPC ........................................................ 707/690
See application file for complete search history.

(56) References Cited

U.S. PATENT DOCUMENTS

| | | | |
|---|---|---|---|
| 5,813,002 A | 9/1998 | Agrawal et al. | |
| 7,716,068 B2* | 5/2010 | Ball | G06F 19/326 600/300 |
| 8,918,677 B1* | 12/2014 | Marokhovsky | G06F 11/16 707/687 |
| 2004/0034699 A1* | 2/2004 | Gotz | H04L 12/24 709/223 |
| 2007/0067278 A1* | 3/2007 | Borodziewicz ... | G06F 17/30675 |
| 2007/0282824 A1* | 12/2007 | Ellingsworth .... | G06F 17/30616 |
| 2009/0244290 A1* | 10/2009 | McKelvey | H04N 7/173 348/181 |
| 2010/0257149 A1* | 10/2010 | Cognigni | G06F 17/30575 707/698 |
| 2014/0074731 A1* | 3/2014 | Lande | G06Q 10/06395 705/306 |
| 2014/0089310 A1* | 3/2014 | Myers | G06F 17/3071 707/737 |

OTHER PUBLICATIONS

Chan, T. et al. "Computing Deviations: Standard Accuracy." Communications of the ACM. vol. 22, No. 9. Sep. 1979.
Lin, D. "An Information-Theoretic Definition of Similarity." Department of Computer Science. University of Manitoba. Canada.
Moreau, et al. "Robust Similarity Measures for Named Entities Matching." Proceedings of the 22nd International Conference on Computational Linguistics (Coling 2008), pp. 593-600. Manchester, Aug. 2008.
Bilenko M. et al. "Adaptive Duplicate Detection Using Learnable String Similarity Measures," Proceedings of the Ninth ACM SIGKDD International Conference on Knowledge Discovery and Data Mining, XP002475117, Aug. 2003, pp. 39-48.
Kumar R.K. et al. "Attribute Correction—Data Cleaning Using Association Rule and Clustering Methods," International Journal of Data Mining & Knowledge Management Process, vol. 1, No. 2, XP55062004, Mar. 2011, pp. 22-32.
Susan P. Imberman "Comparative Statistical Analyses of Automated Booleanization Methods for Data Mining Programs," XP055059303, Jan. 1999, pp. 103.

* cited by examiner

*Primary Examiner* — Joshua Bullock
(74) *Attorney, Agent, or Firm* — Patent Portfolio Builders, PLLC (57) ABSTRACT

Techniques for detecting deviations in data repositories comprising a plurality of data posts, each data post comprising a number of data attribute values. A method comprises identifying comparable data post pairs, each pair comprising first and second data posts in first and second data repositories, respectively, wherein the first data post in a pair is comparable with the second data post of the same pair. Data attribute values of the first data post are compared with data attribute values of the second data post within a plurality of comparable data post pairs to determine quantified similarities between the data attribute values of the first and second data posts of each comparable data post pair. Statistical values of the quantified similarities are calculated by comparing comparable determined quantified similarities for each data post pair, and the calculated statistical values are used for detecting deviations for a first comparable data post pair.

20 Claims, 8 Drawing Sheets

|  | Attribute B1 | Attribute B2 | Attribute B3 | Attribute B4 |
|---|---|---|---|---|
| Attribute A1 | 100% <br> +/- 0% | 0% <br> +/- 50% | 0% <br> +/- 50% | 4% <br> +/- 18% |
| Attribute A2 | 0% <br> +/- 50% | 0% <br> +/- 50% | 75% <br> +/- 0.2% | 14% <br> +/- 45% |
| Attribute A3 | 0% <br> +/- 50% | 10% <br> +/- 20% | 0% <br> +/- 50% | 0% <br> +/- 50% |
| Attribute A4 | 2% <br> +/- 37% | 0% <br> +/- 50% | 99% <br> +/- 0.1% | 0% <br> +/- 50% |
| Attribute A5 | 0% <br> +/- 50% | 1% <br> +/- 47% | 0% <br> +/- 50% | 0% <br> +/- 50% |

Data source A (rows) / Data Source B (columns)

|    | B1         | B2         | B3          | B4          |
|----|------------|------------|-------------|-------------|
| A1 | 1.0        | 0.0        | 0.11111111111 | 0.0       |
| A2 | 0.0        | 0.25       | 0.0         | 0.285714285 |
| A3 | 0.0        | 0.25       | 0.0         | 0.142857142 |
| A4 | 0.09090909 | 0.0        | 0.727272727 | 0.0         |
| A5 | 0.0        | 0.099999999 | 0.0        | 1.0         |

Figure 4

|    | B1         | B2         | B3          | B4         |
|----|------------|------------|-------------|------------|
| A1 | 1.0        | 0.0        | 0.1111111111 | 0.0       |
| A2 | 0.0        | 0.20833333 | 0.0         | 0.14285714 |
| A3 | 0.0        | 0.26388888 | 0.0         | 0.15476190 |
| A4 | 0.09090909 | 0.0        | 0.72727272  | 0.0        |
| A5 | 0.0        | 0.10555555 | 0.0         | 1.0        |

METHOD, APPARATUS AND COMPUTER PROGRAM FOR DETECTING DEVIATIONS IN DATA REPOSITORIES

TECHNICAL FIELD

The present disclosure relates generally to a method, an apparatus and a computer program for detecting deviations in data repositories.

BACKGROUND

In most enterprises, such as mobile communication operators, information is spread over many different data repositories. It is not unusual that data stored in different repositories is duplicated or at least means the same thing. When data that is expected to be the same is, for some reason, not the same, unwanted problems can occur, for example, in a mobile communication network, the user of a mobile phone being unable to make a phone call, or the operator being unable to charge the customer, etc. Thus, inconsistent data can cause a lot of trouble. According to investigations of the applicant, the average mobile communication operator revenue leakage is approximately 2% and a large part of this revenue leakage is a direct or indirect consequence of inconsistent data.

There are tools on the market today that scan data repositories in order to find data inconsistencies, or data deviations. One common problem for such tools is that the tools have to be instructed what to look for in the data repositories. Since each data system comprises data repositories in which data stored have their own data structure, the tool must be instructed for each data repository combination that is to be scanned. I.e., the tool needs instruction about the data repositories' data models and also how the data models relate to each other. However, different systems or repositories may come from different vendors and it can be hard to get access to documentation that describes the data models. Another problem is that the data models are often so complex that even if someone knows or has access to the description of one model it is hard to tell how it relates to another data model. Another issue is that for finding a data deviation, it may also be necessary to understand what is considered to be a deviation and what is not considered to be a deviation.

Furthermore, data in data repositories may change with time. In such cases, what is considered to be a data deviation may change over time.

Consequently, there is a need for a tool for efficiently detecting data deviations between data of different data repositories.

SUMMARY

It is an object of the invention to address at least some of the problems and issues outlined above. It is possible to achieve these objects and others by using a method and an apparatus as defined in the attached independent claims.

According to one aspect, a method is provided for detecting deviations in data repositories, each data repository comprising a plurality of data posts, each data post comprising a number of data attribute values. The method comprises identifying comparable data post pairs, each pair comprising a first data post in a first data repository and a second data post in a second data repository, wherein the first data post in a comparable data post pair is comparable with the second data post of the same data post pair. The method further comprises comparing data attribute values of the first data post with data attribute values of the second data post within a plurality of comparable data post pairs in order to determine quantified similarities between the data attribute values of the first data post and the data attribute values of the second data post of each of the plurality of comparable data post pair. The method further comprises calculating statistical values of the quantified similarities by comparing comparable determined quantified similarities for each of the plurality of comparable data post pairs. The method further comprises using the calculated statistical values of the quantified similarities for detecting deviations for a first comparable data post pair.

According to another aspect, an apparatus is provided, and is configured for detecting deviations in data repositories, each data repository comprising a plurality of data posts, each data post comprising a number of data attribute values. The apparatus comprises an identifying unit for identifying comparable data post pairs, each pair comprising a first data post in a first data repository and a second data post in a second data repository, wherein the first data post in a comparable data post pair is comparable with the second data post of the same data post pair. The apparatus further comprises a comparing unit for comparing data attribute values of the first data post with data attribute values of the second data post within a plurality of data post pairs in order to determine quantified similarities between the data attribute values of the first data post and the data attribute values of the second data post of each of the plurality of comparable data post pairs. The apparatus further comprises a calculating unit for calculating statistical values of the quantified similarities by comparing comparable determined quantified similarities for each of the plurality of comparable data post pairs. The apparatus further comprises a detecting unit for using the calculated statistical values of the quantified similarities for detecting deviations for a first comparable data post pair.

According to a third object, a computer program is provided, comprising computer-readable code means stored in a non-transitory computer-readable medium, wherein the computer program comprises program instructions that, when run in an apparatus configured for detecting deviations in data repositories, cause the apparatus to perform the following steps: identifying comparable data post pairs, each pair comprising a first data post in a first data repository and a second data post in a second data repository, wherein the first data post in a comparable data post pair is comparable with the second data post of the same data post pair; comparing data attribute values of the first data post with data attribute values of the second data post within a plurality of comparable data post pairs in order to determine quantified similarities between the data attribute values of the first data post and the data attribute values of the second data post of each of the plurality of comparable data post pair; calculating statistical values of the quantified similarities by comparing comparable determined quantified similarities for each of the plurality of comparable data post pairs, and using the calculated statistical values of the quantified similarities for detecting deviations for a first comparable data post pair.

The above method and apparatus may be configured and implemented according to different optional embodiments which will become apparent from the detailed description below. Further possible features and benefits of this solution will become apparent from the detailed description.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to detect deviations in data repositories, more specifically in data of at least two different data repositories. The solution is at least partly built on the idea that by identifying patterns in relations between data of two data repositories also deviations from such patterns can be identified.

In this disclosure, a data repository is any entity that holds data such as data base or a document etc. Examples of data repositories are a relation database accessed via Structured Query Language (SQL) or a directory service accessed via Lightweight Directory Access Protocol (LDAP). Other examples are a Microsoft® Excel file, a Comma Separated Values (CSV) file or an Extended Markup Language (XML) file.

In this disclosure, a data post may be a row in a data repository, such as a row in an SQL database table, a row in a Microsoft® Excel file/sheet, a row in a CSV file or an LDAP entry. A data attribute may be a column in a data repository, such as an SQL database table, a column in a Microsoft® Excel file/sheet, a column in a CSV file, or an attribute in an LDAP tree. Of course, it may be the other way around, i.e. a data post may be a column in a data repository, and a data attribute may be a row in a data repository. One data attribute may comprise the data attribute values of one data attribute category. A data attribute category may be e.g. personal identity numbers, or mobile phone numbers (e.g. MSISDN number, Mobile Station Integrated Services Digital Network number). A data post comprises a number of data attribute values, each value being valid for this data post, e.g. the personal identity number and mobile phone number for a certain user connected to this data post, also the name of the user may be one data attribute value for this data post. The data attributes of one data post are called data attribute values. E.g. the data attribute values of a data post may be personal identity number 341001, and MSISDN number 010-2222222, and the name John Smith. A data attribute may comprise the data attribute values concerning the same data attribute category.

According to an embodiment, a method is provided for detecting deviations in data repositories, more specifically for detecting deviations in data attribute values or data posts of data repositories. The method comprises identifying comparable data post pairs, wherein each data post pair comprises a first data post from a first data repository and a second data post from a second data repository, wherein the first data post in a comparable data post pair is comparable with the second data post of the same data post pair. Thereafter, each of the data attribute values of the first data post is compared with each of the data attribute values of the second data post to detect quantified similarities between each of the data attribute values of a comparable data post pair. Thereby, a matrix of quantified similarities is created for each comparable data post pair. The comparison is performed for a plurality of comparable data post pairs. Thereafter, a statistical value is calculated for each quantified similarity by comparing the comparable quantified similarities for the plurality of comparable data post pairs. In other words, the different matrices created for each of the plurality of comparable data post pairs is compared with each other such that matrix values in the same place in the matrix are compared to calculate a statistical value for each place in the matrix. The calculated statistical values can then be used for each data post pair or for a new data post pair, such that the quantified similarities for a data post pair is compared with the calculated statistical value. If a quantified similarity of a data post pair is outside an allowed deviation, a data deviation is detected.

A quantified similarity between data attribute values is defined as any type of quantified relation between the compared data attribute values, wherein the quantified relation is a comparison of the compared data attribute values. The quantified similarity may for example be defined by the Levenshtein algorithm, for example, or the Boyle-Moore string search, but other algorithms for in a quantified way define relations between data attribute values may be used.

Figure 1:
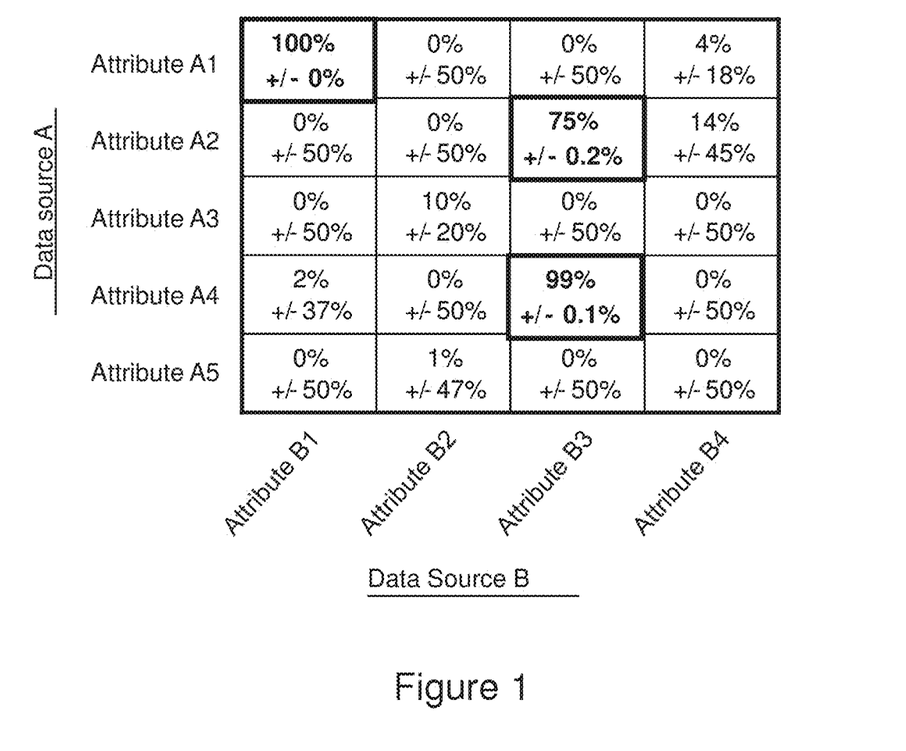
FIG. 1 is a table illustrating a matrix of statistical quantified similarities between data attribute values of a first and a second data repository.

A quantified similarity matrix comprising statistical values for a comparison between data post pairs of a data repository A and a data repository B is shown in FIG. 1. The data repository A comprises data attributes A1-A5 and the data repository B comprises data attributes B1-B5. For a number of comparable data post pairs, the data attribute values of the data post of repository A are compared with the data attribute values of the data post of repository B to detect quantified similarities. In the figure, the comparison of Attribute A1 and Attribute B1 has a quantified similarity average value of 100%, and a standard deviation of 0%, i.e., they comprise exactly the same characters in all data posts. On the other hand, the comparison of Attribute A2 and Attribute B3 has a quantified similarity average value of 75% with a standard deviation of +/−0.2%.

Figure 2:
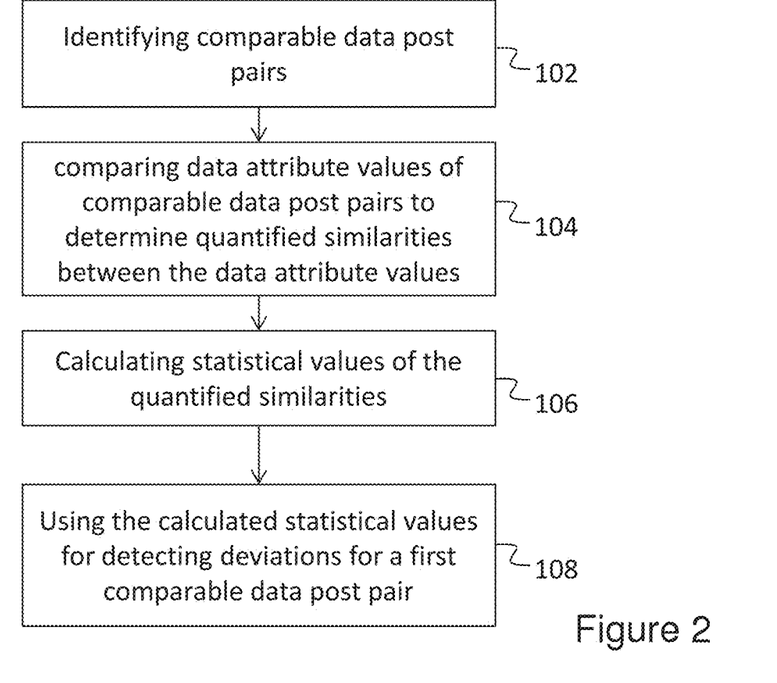
FIG. 2 is a flow chart of a method for detecting deviations in data repositories according to an embodiment.

Another embodiment of a method for detecting deviations in data repositories is described in relation to FIG. 2. In the figure, each data repository comprises a plurality of data posts, each data post comprising a number of data attribute values. The method comprises identifying 102 comparable data post pairs, each pair comprising a first data post in a first data repository and a second data post in a second data repository, wherein the first data post in a comparable data post pair is comparable with the second data post of the same data post pair. The method further comprises comparing 104 data attribute values of the first data post with data attribute values of the second data post within a plurality of comparable data post pairs in order to determine quantified similarities between the data attribute values of the first data post and the data attribute values of the second data post of each of the plurality of comparable data post pairs. The method further comprises calculating 106 statistical values of the quantified similarities by comparing comparable determined quantified similarities for each of the plurality of comparable data post pairs. The method further comprises using 108 the calculated statistical values of the quantified similarities for detecting deviations for a first comparable data post pair.

"A statistical value" may be any value representative for the detected quantified similarities, such as a mean value for substantially all compared values. "Comparing comparable determined quantified similarities for each data post pair" means that quantified similarities for the same combination of data attribute values from the first data post and the second data post are compared for the plurality of comparable data post pairs.

The last step of the method, i.e., using 108 the calculated statistical values of the quantified similarities for detecting deviations for a first comparable data post pair, may be repeated for as many comparable data post pairs as is requested, to detect deviations in each of the data post pairs.

Figure 3:
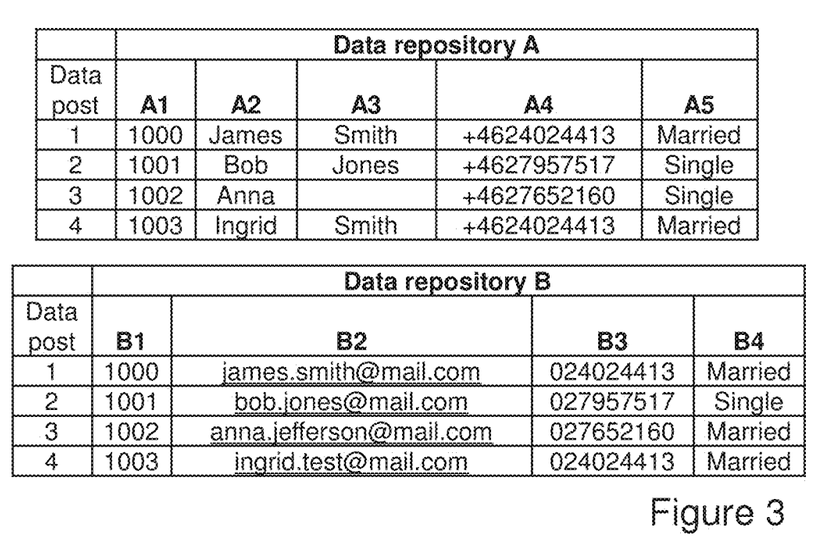
FIG. 3 shows two tables, the tables showing contents in a first data repository and a second data repository, respectively.

The method of deviation detection as described in FIG. 1 will now be described in relation to an example that is shown in FIG. 3. FIG. 3 shows a data repository A and a data repository B, each data repository comprising a number of data posts and a number of data attributes. Data repository A comprises four data posts, wherein the first data post comprises the data attribute values 1000, James, Smith, +4624024413, Married. Data repository B comprises four data posts, wherein the first data post comprises 1000, james.smith@mail.com, 024024413, Married.

A comparable data post pair may comprise a data post from the first data repository and a data post from the second data repository that concerns the same identifier value, e.g. the same value for a determined unique matching data attribute of the first data repository and a determined unique matching data attribute of the second data repository. For example, when performing the identifying 102 of comparable data post pairs in FIG. 2 for the data of FIG. 3, two posts regarding the same user are identified to be comparable. Consequently, in other words, a post of the data repository A is identified to be comparable with a post in the data repository B if they concern the same user. Any identifier may be used for detecting that it is the same user, such as the column A1 and B1. When looking at the data of FIG. 2 one can see that data post 1 of data repository A is comparable with the data post 1 of data repository B. I.e. 1000, James, Smith, +4624024413, Married is comparable with 1000, james.smith@mail.com, 024024413, Married. Four comparable data post pairs can be identified between data repository A and data repository B, i.e. a first data post pair comprising data post 1 of repository A and data post 1 of repository B, a second data post pair comprising data post b1 of repository A and data post 2 of repository B, a third data post pair comprising data post 3 of repository A and data post 3 of repository B, a fourth data post pair comprising data post 4 of repository A and data post 4 of repository B. Even if the data posts had not been in this order, such an identification could have been performed. For example, the data posts may be sorted based on the identifier. This identification may be performed manually or by any type of automatic method such as the method described later on in relation to FIG. 7.

Figure 4:
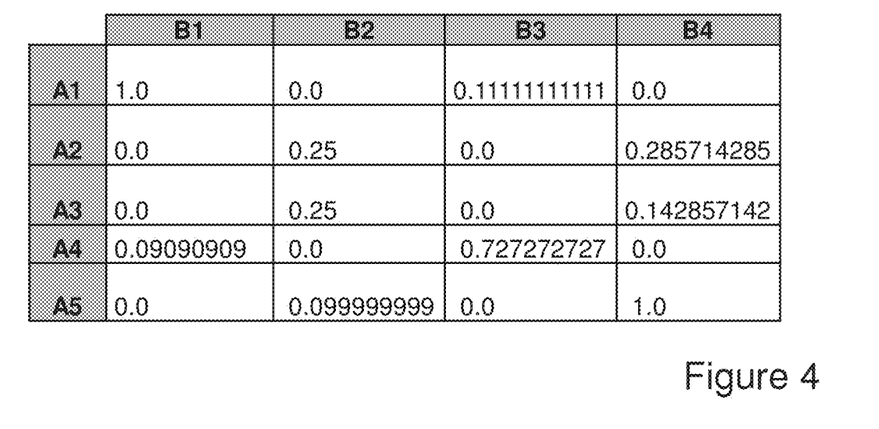
FIG. 4 is a table showing a matrix of quantified similarities of a data post pair.

The step of comparing 104 data attribute values within data post pairs to determine quantified similarities is illustrated in FIG. 4, for the data repositories A and B. In FIG. 4 is shown a matrix of quantified similarities for the data attribute values of data post 1 of repository A and the data attribute values of data post 1 of repository B. The quantified similarities of FIG. 4 are normalized, i.e. 1.0 is exact similarity. As can be seen in FIG. 4, data attribute value A1 (1000) is compared with data attribute value B1 (1000) in the upper left field. This gives a quantified similarity of 1.0, since the data attribute values are exactly the same. In the upper second left field, A1 (1000) is compared with B2 (james.smith@mail.com), this gives a quantified similarity of 0.0, since no character in A1 looks like a character in B2. In the upper third left field, A1 (1000) is compared with B3 (024024413). The quantified similarity is then 0.111111 . . . since there are some characters in common. Further down, possible algorithms for determining quantified similarities will be described.

Figure 5:
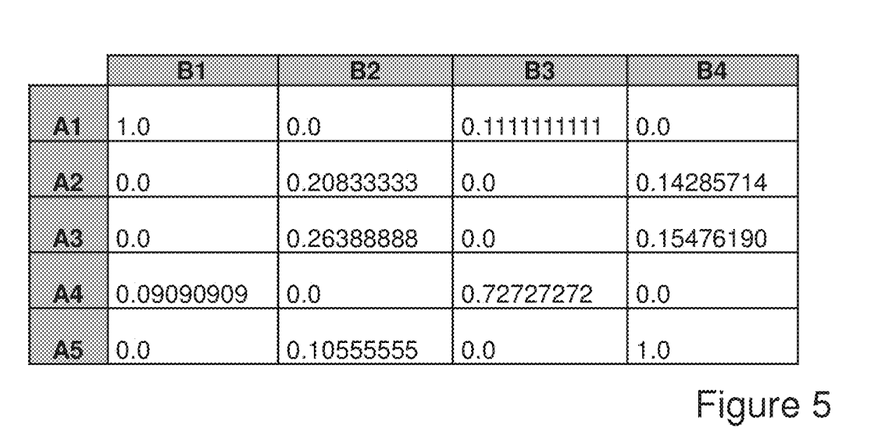
FIG. 5 is a table showing a matrix of statistical quantified similarities of a plurality of comparable data post pairs.

In step 106, quantified similarities determined for many comparable data post pairs are used to calculate statistical values for the quantified similarities. In FIG. 5, a matrix is shown where the quantified similarities of the data post 1 of repository A and data post 1 of repository B is compared to quantified similarities of data post 2 of repository A and data post 2 of repository B. In other words, quantified similarities of two similar matrices as in FIG. 3 for two comparable data post pairs are compared with each other to calculate statistical values of the quantified similarities.

In step 108, the calculated statistical values of quantified similarities are used for detecting deviations in a following data post pair. In the example, a similar matrix of quantified similarities may be performed for the data post pair comprising data post 3 of repository A and data post 3 of repository B. Thereafter, the values of the matrix for the data post pair comprising data post 3 of repository A and data post 3 of repository B is compared with the statistical value matrix of FIG. 5. If there are deviations from the statistical values, a deviation is detected. Note that for simplicity reasons there are no standard deviations mentioned in the FIGS. 4 and 5, but only average values.

As an example, for data post 1 A5 =Married and B4 = Married, the values are equal, i.e., the determined 104 quantified similarity is 1.0. For data post 2 A5 =Single and B4 =Single, the values are equal, i.e., the determined 104 quantified similarity is 1.0. The statistical value of the quantified similarity between A5 and B4 after two data posts is consequently calculated 106 to be 1.0, with a standard deviation of 0.0. For data post 3 A5 =Single but B4 =Married, i.e., the determined 104 quantified similarity is lower than 1.0, i.e., lower than the statistical value of the quantified similarity between A5 and B4. Thereby, a deviation outside the statistical value is detected.

According to an embodiment, the comparing 104 of data attribute values involves comparing the data attribute values of the first data repository and the data attribute values of the second data repository such that a matrix of quantified similarities are achieved, each quantified similarity showing the similarity between a data attribute value of the first data repository and a data attribute value of the second data repository.

According to an embodiment, calculating 106 statistical values of the quantified similarities by comparing comparable determined quantified similarities for each data post pair may be performed for a previous amount of data post pairs. I.e., the statistical value may be calculated on earlier determined quantified similarities, and, the step of using 108 the calculated statistical values of the quantified similarities for detecting deviations is performed for data post pairs that may or may not be a part of the previous amount of data post pairs. In other words, the calculated 106 statistical values of the quantified similarities may not be updated for each data post pair that is compared, or added. For example, at a first occasion, e.g., a first night, the steps 104 and 106 are performed to calculate statistical values of the quantified similarities for the data posts in the first and second data repository. At a following occasion, e.g., a second night, the step 108 is performed to detect deviations of the data posts pairs without updating the statistical values even if data new data posts have been added to the data repositories. At a next occasion, the steps 104 and 106 are again performed to calculate statistical values, incorporating any new data posts.

According to another embodiment, the statistical value of the quantified similarities is updated for each data post pair that is compared to determine quantified similarities. In other words, for each data post pair that a quantified similarity is determined, a new and updated statistical value is calculated. Consequently, the statistical value reflects the current content of the two data repositories. The more and updated information there is, i.e., on the more data post pairs the statistical value is calculated, the better data deviation detection is achieved.

When the first data post pair is compared to calculate quantified similarities, there is no statistical value to compare with. Consequently, it may be necessary to calculate quantified similarities for a number of data post pairs to get a reliable statistical result before the method can be used 108 for detecting deviations on a first data post pairs. On the other hand, the more quantified similarities that have been calculated the more reliable is the statistical result.

In order to compute the quantified similarity between two data attribute values, the values may be treated as strings, i.e., a character sequence, independent of the original type of data attribute.

According to an embodiment, the comparing 104 of data attribute values involves use of Levenshtein distance algorithm, which may be called Levenshtein edit distance algorithm. More specifically, the Levenshtein distance algorithm is used to create the quantified similarity between two data attribute values. The Levenshtein distance algorithm is used on each data attribute combination of a comparable data post pair. The Levenshtein distance is the number of edits (insertions, deletions and substitutions) required to transform a string (A) into another string (B). A mathematical algorithm description of Levenshtein algorithm is described below.

Mathematically, the Levenshtein distance between two strings a, b is given by $lev_{a,b}(|a|,|b|)$, where $$lev_{a,b}(i,j) = \begin{cases} 0, & i = j = 0 \\ i, & j = 0 \text{ and } i > 0 \\ j, & i = 0 \text{ and } j > 0 \\ \min \begin{cases} lev_{a,b}(i-1,j)+1 \\ lev_{a,b}(i,j-1)+1 \\ lev_{a,b}(i-1,j-1)+[a_i \neq b_j] \end{cases} & \text{else} \end{cases}$$

Note that the first element in the minimum clause corresponds to insertion (from a to b), the second to deletion and the third to match or mismatch, depending on whether the respective symbols are the same. The algorithm may be case-sensitive or case-insensitive. For example, the Levenshtein distance between the words "kitten" and "sitting" is 3, since the following three edits change kitten into sitting or vice versa, and there is no way to do it with fewer than three edits:

kitten→sitten (substitution of 's' for 'k')
sitten→sittin (substitution of 'i' for 'e')
sittin→sitting (insertion of 'g' at the end).

After using the Levenshtein distance algorithm on a data post pair, the edit distance may be normalized. When normalizing, the similarity will span between 0.0 and 1.0. According to an alternative, the edit distance may be normalized according to the following algorithm:

normalizedSimilarity=1−editDist($a,b$)/maxLen($a,b$)

where maxLen(a,b) is the data attribute value with the most characters, i.e. the longest attribute value. Consequently, this algorithm gives an edit distance normalized based on the longest attribute value. According to another alternative, the edit distance may be normalized according to the following algorithm: normalizedSimilarity=1/(1+editDist(a, b)).

The normalized edit distances of a number of data post pairs may be used to calculate a statistical average value of the edit distance. Also, a standard deviation may be calculated from the normalized edit distances. The standard deviation may be calculated using, for example, West's algorithm. Depending on whether the determining of quantified similarities and the calculating of statistical values is performed on a fixed set of data (below called population variance), or whether the determining and calculating is performed on a constantly changing set, i.e., updated with the last determined similarity, (below called sample variance), the standard deviation algorithm may be used in two different alternatives. For sample variance, the following formula may be used:

variance=sum(($x\_i$−mean)^2)/($n$−1)

For population variance, the following formula may be used:

variance=sum(($x\_i$−mean)^2)/$n$, where sum($x\_i$)/n is the average value and n is the number of sample observations, i.e. the number of comparable data post pairs and x_i means all values that the average value is based upon.

In order to compute proper average and standard deviation values, the number of computations is memorized.

Each average normalized similarity distance value and its standard deviation value may be stored in a memory of an apparatus for detecting deviations that may be called a Deviation Detector, for further deviation detection. The apparatus will be described in more detail further down in this disclosure.

Figure 6:
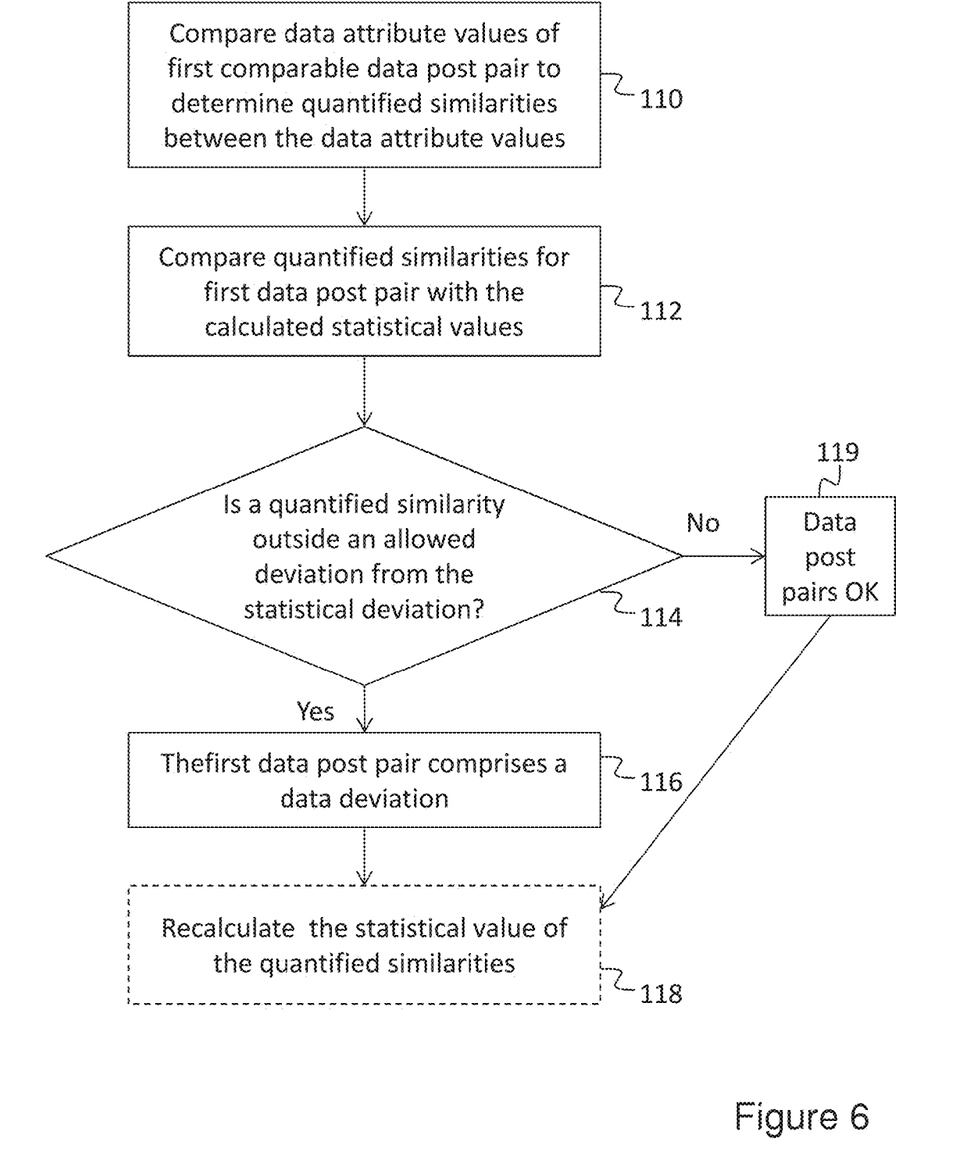
FIG. 6 is a flow chart of a method for using statistical values of quantified similarities for detecting deviations for a comparable data post pair according to an embodiment.

FIG. 6 describes a method according to an embodiment for using the calculated statistical values of the quantified similarities for detecting deviations for a first comparable data post pair, i.e. a possible definition of step 108.

The method of FIG. 6 may comprise comparing 110 data attribute values of a first data post of the first comparable data post pair with data attribute values of the second data post of the first comparable data post pair in order to determine quantified similarities between the data attribute values of the first data post and the data attribute values of the second data post of the first comparable data post pair. In this step, quantified similarities are determined for the first data post, as in step 104. Alternatively, step 110 may already have been performed as a part of step 104. The method of FIG. 6 may also comprise comparing 112 determined quantified similarities for the first comparable data post pair with the calculated statistical values. When a determined quantified similarity of the first comparable data post pair is determined 114 to be outside an allowed deviation from a statistical value, it is concluded 116 that the first comparable data post pair comprises a data deviation. "An allowed deviation" may be any defined deviation from the mean value for the compared values, such as the standard deviation. When a determined quantified similarity of the first comparable data post pair is determined 114 to be within an allowed deviation from a statistical value, it is concluded 119 that the first comparable data post pair is OK. The method may also comprise a step of recalculating 118 the statistical value of the quantified similarities for the data post pairs now also including the quantified similarity of the first data post pair.

Figure 7:
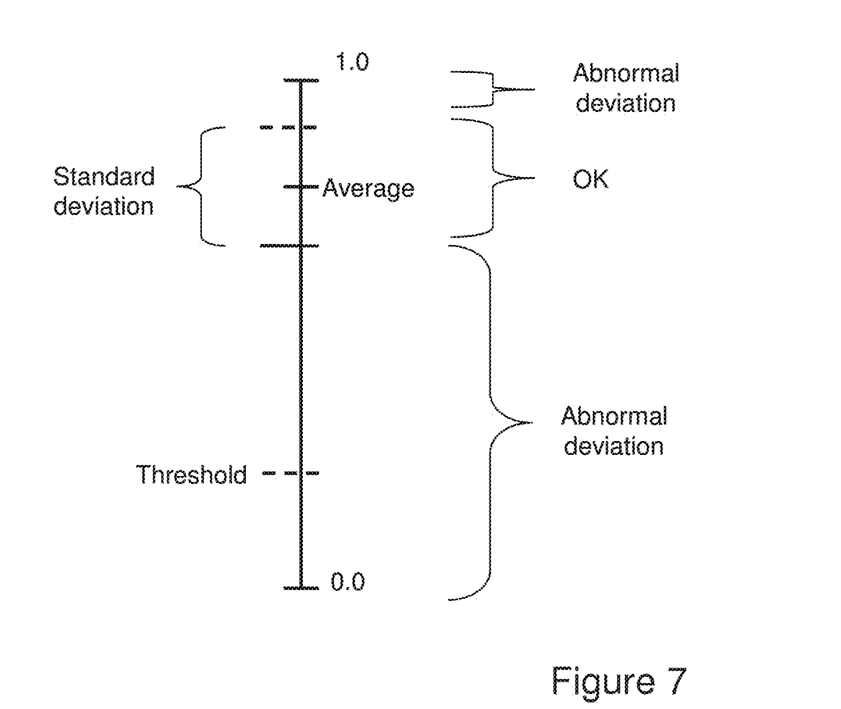
FIG. 7 is a one-dimensional graph of a normalized quantified similarity.

According to an embodiment, a threshold may be needed to filter out irrelevant statistical quantified similarities for a data post pair. Such a threshold is illustrated in FIG. 7. From FIG. 7 it can also be seen that a quantified similarity of a data post pair could be within the standard deviation from a statistical average value. In that case, the quantified similarity of the data post pair is OK. The quantified similarity of the data post pair may then also be used for calculating an updated statistical value, if this is to be done. If a quantified similarity of a data post pair is outside the standard deviation from the statistical average value, it is concluded that the data post pair comprises a deviation. Such a quantified similarity of the data post pair may then also be used for calculating an updated statistical value, if this is to be done. If a calculated statistical value of a quantified similarity between a certain combination of data attributes is very low, e.g., as below the threshold in FIG. 7, it is concluded that this statistical value has no relevance. In other words, the statistical value does not show any similarity pattern between the two compared data attributes and no deviation detection will be used for this combination of data attributes.

Figure 8:
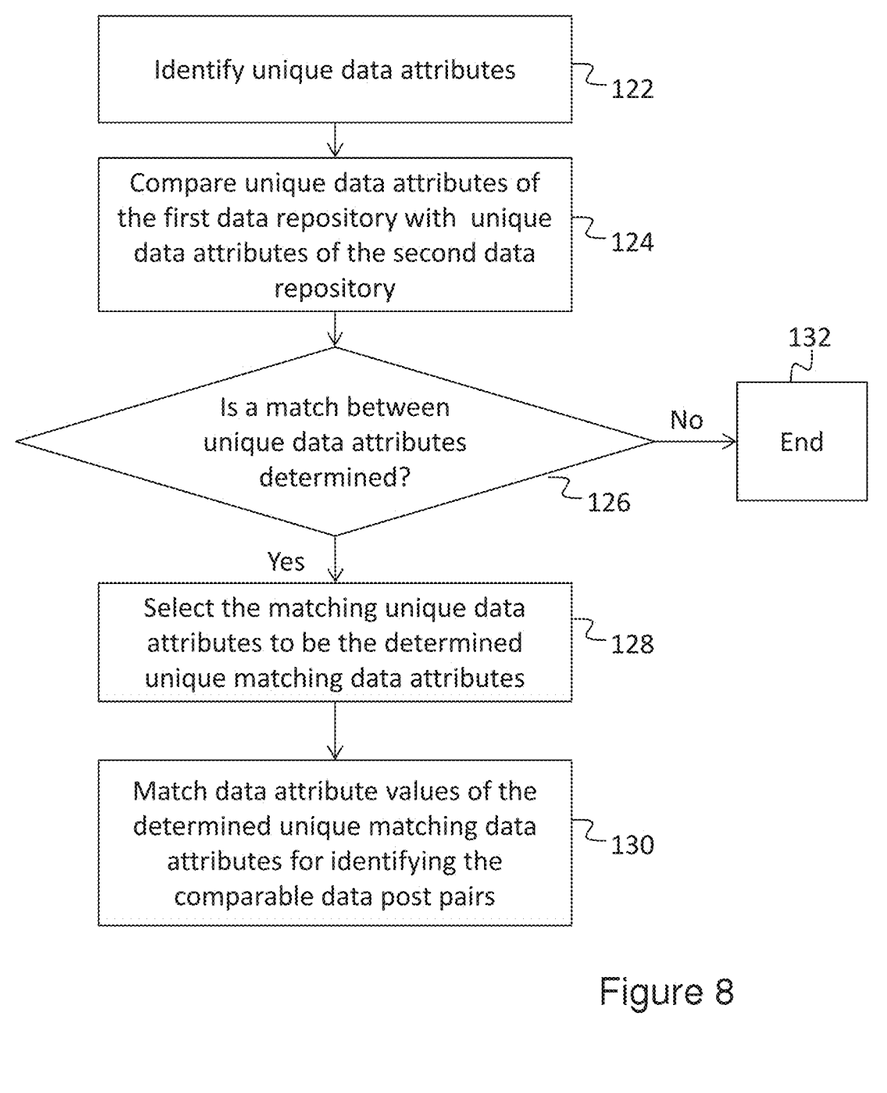
FIG. 8 is a flow chart of a method for identifying comparable data post pairs according to an embodiment.

FIG. 8 describes an embodiment of a method for identifying comparable data post pairs, which may be used for performing step 102 of FIG. 2. The method may comprise determining 122, 124, 126, 128 a unique matching data attribute in each of the first data repository and the second data repository, and matching 130 data attribute values of the determined unique matching data attribute of the first data repository and data attribute values of the determined unique matching data attribute of the second data repository for identifying the comparable data post pairs.

"A unique data attribute" means that in a data repository, all data attribute values for this data attribute are unique. With other words, there is no data attribute value for this data attribute that is the same as any other data attribute value for the same data attribute.

A match between unique data attributes of the first data repository and unique data attributes of the second data repository means that there are similar data attribute values in the first data repository as in the second data repository. In other words, if many or at least some data attribute values for the unique data attributes are the same in the first data repository as in the second data repository, a unique matching data attribute is determined. "Matching" 130 data attribute values of the determined unique matching data attributes means identifying data post pairs in which the same data attribute value for the unique data attribute is found in each of the data repositories.

According to an embodiment shown in FIG. 8, the determining 122, 124, 126, 128 of a unique matching data attribute in each of the first data repository and the second data repository may comprise identifying 122 unique data attributes within the first data repository and unique data attributes within the second data repository and comparing 124 the unique data attributes identified in the first data repository with the unique data attributes identified in the second data repository in order to determine a unique data attribute in the first data repository that matches a unique data attribute in the second data repository. When a match between unique data attributes is determined, 126, the matching unique data attributes are selecting 128 to be the determined unique matching data attributes. The data posts may be sorted based on the matching unique data attributes such that data posts of comparable data post pairs are in the same position in the first and the second data repository.

The method for identifying comparable data post pairs may be used only one time to decide which data attributes that should be treated as unique identifiers, i.e. unique matching data attributes, in order to determine if data posts are comparable or not. The method may be optional, e.g., if the unique identifiers are identified in some other ways, e.g., manually or using metadata from an SQL data base etc.

By scanning data of the first data repository and the second data repository it is possible to detect unique columns, i.e., data attributes, which can be seen as candidates for unique identifiers. To find out if the column is unique, each value of the column is compared with all other values in its column. If the value is represented more than once, the column is determined not to be unique. No further comparison is performed on that column and the column is excluded. In the end there may be at least one unique column in each data repository. To decide which unique column in each data repository is the unique identifier, the corresponding (e.g., first) data post from each data repository is picked and the value from a first candidate unique column from the first data repository is compared with the values from all candidate unique columns in the second data repository until a match is found. The method continues with the next data post. The method then continues with the next candidate unique column in the first data repository. The unique identifier in each data repository is the column in each data repository for which the most matches between columns are found.

Continuing with the example of FIG. 3 for the exemplary method for identifying comparable data post pairs: the method starts by checking column A1 in data repository A. First data post 4, column A1 is checked, the value is "1000". It is checked whether "1000" is represented more than once in this column. If so, no further check is done and the A1 column would be considered not unique. If the value was unique, the method continues with the value 1001, etc. In this example, it is considered that column A1 is unique: No value is used more than once in the column. The same procedure is used on all columns A1-A5. In the end, two unique columns are found: A1 and A2. The same procedure is used on the data repository B. AS a result, two unique columns are found: B1 and B2. This means that A1, A2 , B1 and B2 are our candidates for unique identifiers.

Figure 9:
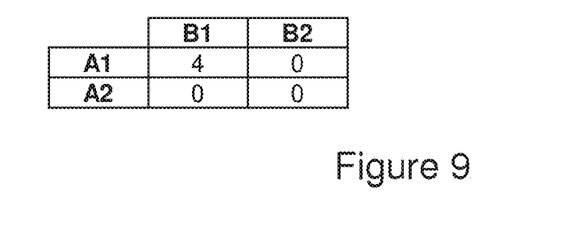
FIG. 9 is a table showing an example of matching of candidate identifier columns.

In the next step, the unique identifiers are to be selected from the candidates, i.e. to decide which columns that are to be the unique identifiers. Consequently, the values are matched between all candidate columns, i.e. A1 is matched with B1, A2 with B1, A1 with B2 and A2 with B2. The highest degree of match shows which columns are the identifiers. The result is shown in FIG. 9. As seen in FIG. 9, there are four matches between columns A1 and B1 and zero matches between A1 and B2, A2 and B1 and A2 and B2, respectively. Consequently, columns A1 and B1 are selected as the unique identifiers.

Figure 10:
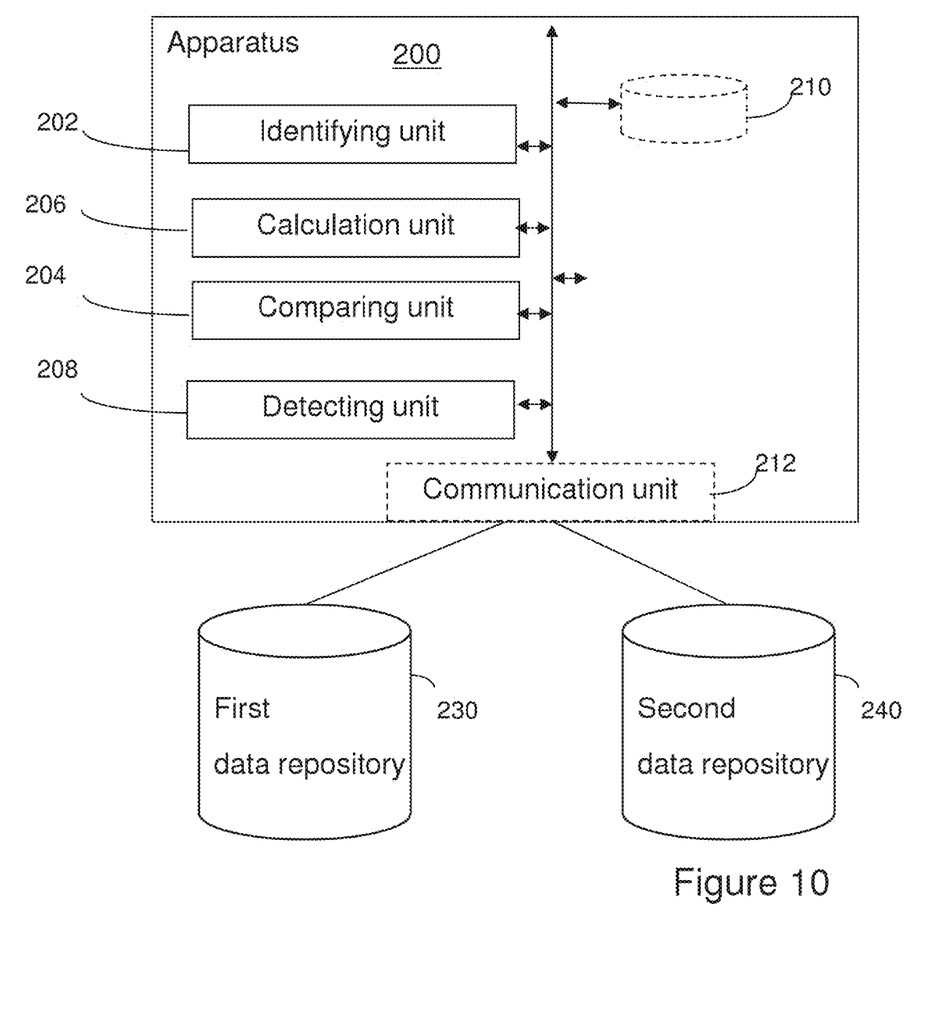
FIG. 10 is a schematic block diagram of an example arrangement according to the invention.

FIG. 10 shows an apparatus 200 according to an embodiment, the apparatus being configured for detecting deviations in data repositories, each data repository comprising a plurality of data posts, each data post comprising a number of data attribute values. A first data repository 230 and a second data repository 240 are connected to the apparatus in FIG. 10. The apparatus comprises: an identifying unit 202 for identifying comparable data post pairs, each pair comprising a first data post in a first data repository 230 and a second data post in a second data repository 240. The first data post in a comparable data post pair is comparable with the second data post of the same data post pair. The apparatus further comprises a comparing unit 204 for comparing data attribute values of the first data post with data attribute values of the second data post within a plurality of data post pairs in order to determine quantified similarities between the data attribute values of the first data post and the data attribute values of the second data post of each of the plurality of comparable data post pairs. The apparatus further comprises a calculating unit 206 for calculating statistical values of the quantified similarities by comparing comparable determined quantified similarities for each of the plurality of comparable data post pairs. The apparatus further comprises a detecting unit 208 for using the calculated statistical values of the quantified similarities for detecting deviations for a first comparable data post pair. The apparatus 200 may further comprise a communication unit 212, which may be considered to comprise conventional means for communication from and/or to the data repositories. The apparatus 200 may further comprise one or more storage units or memories 210.

According to an embodiment, the detection unit 208 is arranged to use the calculated statistical values of the quantified similarities for detecting deviations in data for a first comparable data post pair by comparing data attribute values of a first data post of the first comparable data post pair with data attribute values of the second data post of the first comparable data post pair in order to determine quantified similarities between the data attribute values of the first data post and the data attribute values of the second data post of the first comparable data post pair. The detection unit 208 is further arranged to use the calculated statistical values of the quantified similarities for detecting deviations in data for a first comparable data post pair by comparing determined quantified similarities for the first comparable data post pair with the calculated statistical values. When a determined quantified similarity of the first comparable data post pair is determined to be outside an allowed deviation from a statistical value, the detection unit 208 is arranged to conclude that the first comparable data post pair comprises a data deviation.

According to an embodiment, the comparing unit 204 is arranged to compare data attribute values by involving use of Levenshtein distance algorithm.

According to another embodiment, the comparing unit 204 is arranged to compare data attribute values by comparing the data attribute values of the first data repository 230 and the data attribute values of the second data repository 240 such that a matrix of quantified similarities are achieved, each quantified similarity showing the similarity between a data attribute value of the first data repository and a data attribute value of the second data repository.

According to yet another embodiment, the identifying unit 202 is arranged to identify comparable data post pairs by determining a unique matching data attribute in each of the first data repository 230 and the second data repository 240, and matching data attribute values of the determined unique matching data attribute of the first data repository and data attribute values of the determined unique matching data attribute of the second data repository for identifying the comparable data post pairs.

According to another embodiment, the identifying unit 202 is arranged to determine a unique matching data attribute in each data repository by identifying unique data attributes within the first data repository and unique data attributes within the second data repository. The identifying unit 202 is further arranged to compare unique data attributes identified in the first data repository with unique data attributes identified in the second data repository in order to determine a unique data attribute in the first data repository that matches a unique data attribute in the second data repository. When a match between unique data attributes is determined, the identifying unit is arranged to select the matching unique data attributes to be the determined unique matching data attributes.

According to another embodiment, the calculation unit 206 is arranged to calculate the statistical values of the quantified similarities based on a previous amount of data post pairs.

According to another embodiment, the calculation unit 206 is arranged to update the calculation of the statistical values of the quantified similarities for each data post pair being compared.

It will be appreciated that each of the units illustrated in FIG. 10 may be implemented using one or more microprocessors, controllers, digital signal processors, and/or specialized digital hardware, and may include programmable circuits configured with appropriate program code for carrying out the detailed functionality described above.

Figure 11:
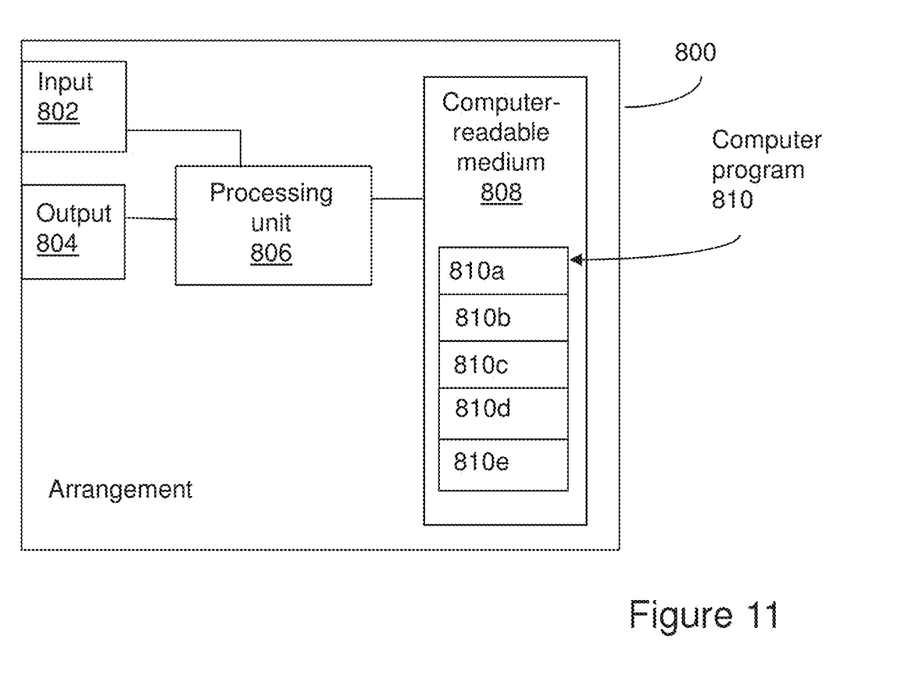
FIG. 11 is a schematic block diagram of another example arrangement according to the invention.

Thus, for example, FIG. 11 schematically shows an embodiment of an apparatus 800 configured for detecting deviations in data repositories, which apparatus also can be an alternative way of implementing an embodiment of the apparatus 200 illustrated in FIG. 10. Comprised in the arrangement 800 is a processing unit 806, e.g. with a DSP (Digital Signal Processor) or a microprocessor. The processing unit 806 may be a single unit or a plurality of units to perform different actions of procedures described herein. The arrangement 800 may also comprise an input unit 802 for receiving signals from other entities, and an output unit 804 for providing signal(s) to other entities. The input unit 802 and the output unit 804 may be arranged as an integrated entity.

Furthermore, the arrangement 800 comprises at least one computer-readable medium 808 in the form of a non-volatile or volatile memory, e.g. an EEPROM (Electrically Erasable Programmable Read-only Memory), a flash memory, a disk drive or a RAM (Random-access memory). The computer-readable medium 808 comprises a computer program 810, which comprises code means, which when executed in the processing unit 806 in the arrangement 800 causes the arrangement to perform the actions of any of the procedures described earlier in conjunction with any of FIG. 2, 6 or 8.

The computer program 810 may be configured as a computer program code structured in computer program modules. Hence, in an exemplifying embodiment, the code means in the computer program 810 of the arrangement 800 comprises an identifying module 810a for identifying comparable data post pairs, each pair comprising a first data post in a first data repository and a second data post in a second data repository, wherein the first data post in a comparable data post pair is comparable with the second data post of the same data post pair. The computer program further comprises a comparing module 810b for comparing data attribute values of the first data post with data attribute values of the second data post within a plurality of data post pairs in order to determine quantified similarities between the data attribute values of the first data post and the data attribute values of the second data post of each of the plurality of comparable data post pairs. The computer program further comprises a calculating module 810c for calculating statistical values of the quantified similarities by comparing comparable determined quantified similarities for each of the plurality of comparable data post pairs. The computer program further comprises a detecting module 810d for using the calculated statistical values of the quantified similarities for detecting deviations for a first comparable data post pair.

The processing unit 806 may be a single Central processing unit (CPU) but it could also comprise two or more processing units. For example, the processing unit may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM (Electrical Erasable Programmable ROM), and the computer program modules described above could in alternative embodiments be distributed on different computer program products in the form of memories within the network node.

Although the code means in the embodiments disclosed above in conjunction with FIG. 11 are implemented as computer program modules which when executed in the processing unit causes the apparatus to perform the actions described above in the conjunction with figures mentioned above, at least one of the code means may in alternative embodiments be implemented at least partly as hardware circuits.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

What is claimed is:

1. A method for detecting deviations in data repositories, each data repository comprising a plurality of data posts, each data post comprising a number of data attribute values, the method comprising:
    identifying a plurality of comparable data post pairs, each of the plurality of comparable data post pair comprising a first data post in a first data repository and a second data post in a second data repository, wherein the first data post in a comparable data post pair is comparable with the second data post of the same data post pair;
    comparing each of the data attribute values of the first data post with each of the data attribute values of the second data post within each of the identified plurality of comparable data post pairs;
    determining, from the comparison, quantified similarities between each of the data attribute values of the first data post and each of the data attribute values of the second data post of each of the identified plurality of comparable data post pairs;
    calculating statistical values of the determined quantified similarities by comparing comparable determined quantified similarities for each of the identified plurality of comparable data post pairs; and
    using the calculated statistical values of the determined quantified similarities for detecting deviations for a first comparable data post pair.

2. The method of claim 1, wherein using the calculated statistical values of the determined quantified similarities for detecting the deviations in the data repositories for the first comparable data post pair comprises:
    comparing each of the data attribute values of the first data post of the first comparable data post pair with each of the data attribute values of the second data post of the first comparable data post pair;
    determining, from the comparison, quantified similarities between each of the data attribute values of the first data post and each of the data attribute values of the second data post of the first comparable data post pair;
    comparing the determined quantified similarities for the first comparable data post pair with the calculated statistical values; and
    in response to determining that a determined quantified similarity of the first comparable data post pair is outside an allowed deviation from a statistical value, concluding that the first comparable data post pair comprises a data deviation.

3. The method of claim 1, wherein the comparing of each of the data attribute values of the first data post with each of the data attribute values of the second data post within each of the identified plurality of comparable data post pairs uses a Levenshtein distance algorithm.

4. The method of claim 1, wherein the comparing of each of the data attribute values of the first data post with each of the data attribute values of the second data post within each of the identified plurality of comparable data post pairs comprises comparing each of the data attribute values of the first data repository and each of the data attribute values of the second data repository such that a matrix of the determined quantified similarities is achieved, each determined quantified similarity showing a similarity between a data attribute value of the first data repository and a data attribute value of the second data repository.

5. The method of claim 1, wherein the identifying of the plurality of comparable data post pairs comprises:
    determining a unique matching data attribute in each of the first data repository and the second data repository; and
    matching data attribute values of the determined unique matching data attribute of the first data repository and data attribute values of the determined unique matching data attribute of the second data repository for identifying the plurality of comparable data post pairs.

6. The method of claim 5, wherein the determining of the unique matching data attribute in each data repository comprises:
identifying unique data attributes within the first data repository and unique data attributes within the second data repository;
comparing the unique data attributes identified in the first data repository with the unique data attributes identified in the second data repository in order to determine a unique data attribute in the first data repository that matches a unique data attribute in the second data repository; and
in response to determining a match between the unique data attributes, selecting the matching unique data attributes to be the determined unique matching data attributes.

7. The method of claim 1, wherein the statistical values of the determined quantified similarities are calculated based on a previous number of data post pairs.

8. The method of claim 1, wherein the calculated statistical values of the determined quantified similarities are updated for each data post pair being compared.

9. The method of claim 1, wherein a determined quantified similarity indicates a numerical measure of similarity between a data attribute value of the first data post and a data attribute value of the second data post of comparable data post pair.

10. An apparatus configured for detecting deviations in data repositories, each data repository comprising a plurality of data posts, each data post comprising a number of data attribute values, the apparatus comprising:
a processing circuit configured to:
identify a plurality of comparable data post pairs, each of the plurality of comparable data post pair comprising a first data post in a first data repository and a second data post in a second data repository, wherein the first data post in a comparable data post pair is comparable with the second data post of the same data post pair;
compare each of the data attribute values of the first data post with each of the data attribute values of the second data post within each of the identified plurality of data post pairs;
determine, from the comparison, quantified similarities between each of the data attribute values of the first data post and each of the data attribute values of the second data post of each of the identified plurality of comparable data post pairs;
calculate statistical values of the determined quantified similarities by comparing comparable determined quantified similarities for each of the identified plurality of comparable data post pairs; and
use the calculated statistical values of the determined quantified similarities for detecting deviations for a first comparable data post pair.

11. The apparatus of claim 10, wherein the processing circuit is configured to use the calculated statistical values of the determined quantified similarities for detecting the deviations in the data repositories for the first comparable data post pair by:
comparing each of the data attribute values of the first data post of the first comparable data post pair with each of the data attribute values of the second data post of the first comparable data post pair;
determining, from the comparison, quantified similarities between each of the data attribute values of the first data post and each of the data attribute values of the second data post of the first comparable data post pair;
comparing the determined quantified similarities for the first comparable data post pair with the calculated statistical values; and
responsive to determining that a determined quantified similarity of the first comparable data post pair is outside an allowed deviation from a statistical value, concluding that the first comparable data post pair comprises a data deviation.

12. The apparatus of claim 10, wherein the processing circuit is configured to compare each of the data attribute values of the first data post with each of the data attribute values of the second data post within each of the identified plurality of comparable data post pairs using a Levenshtein distance algorithm.

13. The apparatus of claim 10, wherein the processing circuit is configured to compare each of the data attribute values of the first data post with each of the data attribute values of the second data post within each of the identified plurality of comparable data post pairs by comparing each of the data attribute values of the first data repository and each of the data attribute values of the second data repository such that a matrix of the determined quantified similarities is achieved, each determined quantified similarity showing a similarity between a data attribute value of the first data repository and a data attribute value of the second data repository.

14. The apparatus of claim 10, wherein the processing circuit is configured to identify the plurality of comparable data post pairs by determining a unique matching data attribute in each of the first data repository and the second data repository, and matching data attribute values of the determined unique matching data attribute of the first data repository and data attribute values of the determined unique matching data attribute of the second data repository for identifying the plurality of comparable data post pairs.

15. The apparatus of claim 14, wherein the processing circuit is configured to determine the unique matching data attribute in each data repository by:
identifying unique data attributes within the first data repository and unique data attributes within the second data repository;
comparing the unique data attributes identified in the first data repository with the unique data attributes identified in the second data repository in order to determine a unique data attribute in the first data repository that matches a unique data attribute in the second data repository; and
responsive to determining a match between the unique data attributes, selecting the matching unique data attributes to be the determined unique matching data attributes.

16. The apparatus of claim 10, wherein the processing circuit is configured to calculate the statistical values of the determined quantified similarities based on a previous number of data post pairs.

17. The apparatus of claim 10, wherein the processing circuit is configured to update the calculation of the statistical values of the determined quantified similarities for each data post pair being compared.

18. The apparatus of claim 10, wherein a determined quantified similarity indicates a numerical measure of similarity between a data attribute value of the first data post and a data attribute value of the second data post of an identified comparable data post pair.

19. A non-transitory computer-readable medium comprising a computer program stored thereupon, the computer program comprising computer-readable code instructions that, when run in an apparatus configured for detecting deviations in data repositories, cause the apparatus to:
- identify a plurality of comparable data post pairs, each of the plurality of comparable data post pair comprising a first data post in a first data repository and a second data post in a second data repository, wherein the first data post in a comparable data post pair is comparable with the second data post of the same data post pair;
- compare each of the data attribute values of the first data post with each of the data attribute values of the second data post within each of the identified plurality of comparable data post pairs;
- determine, from the comparison, quantified similarities between each of the data attribute values of the first data post and each of the data attribute values of the second data post of each of the identified plurality of comparable data post pairs;
- calculate statistical values of the determined quantified similarities by comparing comparable determined quantified similarities for each of the identified plurality of comparable data post pairs; and
- use the calculated statistical values of the determined quantified similarities for detecting deviations for a first comparable data post pair.

20. The non-transitory computer-readable medium of claim 19, wherein a determined quantified similarity indicates a numerical measure of similarity between a data attribute value of the first data post and a data attribute value of the second data post of an identified comparable data post pair.

* * * * *